United States Patent
Hayman

(10) Patent No.: US 9,584,457 B2
(45) Date of Patent: Feb. 28, 2017

(54) INDICATING STATUS OF APPLICATION PROGRAM WITH ICONS

(71) Applicant: BlackBerry Limited, Waterloo (CA)

(72) Inventor: Scott Hayman, Oakville (CA)

(73) Assignee: BlackBerry Limited, Waterloo, Ontario (CA)

( * ) Notice: Subject to any disclaimer, the term of this patent is extended or adjusted under 35 U.S.C. 154(b) by 301 days.

(21) Appl. No.: 14/521,445

(22) Filed: Oct. 22, 2014

(65) Prior Publication Data

US 2015/0046840 A1     Feb. 12, 2015

Related U.S. Application Data

(63) Continuation of application No. 12/086,766, filed as application No. PCT/CA2006/002059 on Dec. 19, 2006, now Pat. No. 8,887,080.

(30) Foreign Application Priority Data

Dec. 19, 2005  (EP) .................................. 05112434

(51) Int. Cl.
| | |
|---|---|
| *G06F 3/00* | (2006.01) |
| *H04L 12/58* | (2006.01) |
| *G06F 3/0481* | (2013.01) |
| *G06F 9/44* | (2006.01) |
| *G06F 3/0482* | (2013.01) |
| *G06Q 10/10* | (2012.01) |

(52) U.S. Cl.
CPC ............ *H04L 51/22* (2013.01); *G06F 3/0481* (2013.01); *G06F 3/0482* (2013.01); *G06F 3/04817* (2013.01); *G06F 9/4443* (2013.01); *G06Q 10/107* (2013.01)

(58) Field of Classification Search
CPC ...................................................... G06F 3/0481
USPC ........................................................ 715/752
See application file for complete search history.

(56) References Cited

U.S. PATENT DOCUMENTS

| | | | | |
|---|---|---|---|---|
| 6,014,135 | A * | 1/2000 | Fernandes ............. | G06F 3/0481 709/203 |
| 6,546,417 | B1 * | 4/2003 | Baker ................... | G06Q 10/107 709/206 |
| 6,691,111 | B2 * | 2/2004 | Lazaridis ............. | G06F 17/2765 |
| 7,107,544 | B1 * | 9/2006 | Luke .................... | G06Q 10/107 715/752 |
| 7,536,440 | B2 * | 5/2009 | Budd .................... | G06Q 10/107 709/203 |
| 7,631,045 | B2 * | 12/2009 | Boerries ............... | H04L 67/327 707/999.1 |
| 7,796,141 | B2 * | 9/2010 | Sheridan ............... | G06F 3/0481 345/660 |

(Continued)

*Primary Examiner* — William Titcomb

(74) *Attorney, Agent, or Firm* — Jon Gibbons; Fleit Gibbons Gutman Bongini & Bianco, P.L.

(57) ABSTRACT

A computing device (100) and computing environment displays a graphical user interface (110) that presents a plurality of icons (260). Each icon is related to a different aspect of a resident software application. The icons are used to indicate the status of their associated aspects of the software application. Changes of state of the aspects of the software application represented by the displayed icons are determined and used to update the displayed icons so that the displayed icons present current status information concerning the associated aspects of the software application.

12 Claims, 4 Drawing Sheets

(56) References Cited

U.S. PATENT DOCUMENTS

| | | | | |
|---|---|---|---|---|
| 8,869,064 B2 * | 10/2014 | Kuo | ................... | G06F 3/04817 |
| | | | | 715/810 |
| 2002/0002453 A1 * | 1/2002 | Lazaridis | ............ | G06F 17/2765 |
| | | | | 704/9 |
| 2002/0163538 A1 * | 11/2002 | Shteyn | ................. | G06Q 10/107 |
| | | | | 715/752 |
| 2003/0119562 A1 * | 6/2003 | Kokubo | ............ | H04M 1/72522 |
| | | | | 455/566 |
| 2003/0197740 A1 * | 10/2003 | Reponen | ............... | G06F 3/0362 |
| | | | | 715/810 |
| 2004/0222978 A1 * | 11/2004 | Bear | ........................ | G06F 1/16 |
| | | | | 345/184 |
| 2005/0064911 A1 * | 3/2005 | Chen | ................... | G06F 1/1616 |
| | | | | 455/566 |
| 2005/0076087 A1 * | 4/2005 | Budd | ................... | G06Q 10/107 |
| | | | | 709/206 |
| 2005/0188312 A1 * | 8/2005 | Bocking | ............... | G06F 3/0484 |
| | | | | 715/739 |
| 2005/0188320 A1 * | 8/2005 | Bocking | ............... | G06F 3/0482 |
| | | | | 715/752 |
| 2005/0198584 A1 * | 9/2005 | Matthews | ............. | G06F 3/0482 |
| | | | | 715/779 |
| 2006/0010395 A1 * | 1/2006 | Aaltonen | .............. | G06F 3/0482 |
| | | | | 715/779 |
| 2006/0284892 A1 * | 12/2006 | Sheridan | ............... | G06F 3/0481 |
| | | | | 345/661 |
| 2007/0189737 A1 * | 8/2007 | Chaudhri | ............. | G06F 3/0482 |
| | | | | 386/234 |

* cited by examiner

INDICATING STATUS OF APPLICATION PROGRAM WITH ICONS

CROSS-REFERENCE TO RELATED APPLICATION

This application is a Continuation of U.S. application Ser. No. 12/086,766, filed Dec. 22, 2008, which claims priority to PCT/CA2006/002059, filed Dec. 19, 2006, which claims priority to European Patent Application 05112434.5, filed Dec. 19, 2005, all of which are incorporated herein by reference in their entirety.

FIELD

This disclosure relates to a computing device and computing environment wherein a graphical user interface is displayed that presents multiple icons, each icon relating to a different aspect of a resident software application.

BACKGROUND

In many computing environments, it is common to display a graphical user interface or desktop that presents icons relating to resident software applications. In some instances, the displayed icons represent resident software applications that are launched and running on the computing device while in other instances, the displayed icons represent resident software applications that are dormant. In the later case, by selecting a displayed icon associated with a dormant software application, the related software application can executed or "launched". Once launched, depending on the configuration of the software application, either an application graphical user interface is displayed, allowing the user to interact with the launched software application, or an icon is displayed to identify visually to the user that the software application is running. In the former case, the application graphical user interface can often be minimized to reduce it to an icon on the desktop.

Unfortunately, displayed icons are typically static, and although a user can interact with such displayed icons to launch or interact with software applications, the displayed icons themselves provide little if any information concerning the status of the software applications. In many instances, having more information concerning the status of launched software applications readily available is desired.

Although some software applications, such as Microsoft Outlook® display folder icons that provide some information concerning the status of the software application, the status information is limited. As will be appreciated, there is a desire for graphical user interfaces or desktops that provide more status information concerning resident software applications that are running on computer devices.

SUMMARY

Accordingly, in one aspect there is provided in a computing environment where a graphical user interface is displayed that presents multiple icons, each icon relating to a different aspect of the same resident software application, a method of indicating the status of said software application comprising:

determining when a change in the status of an aspect of said software application represented by a displayed icon occurs; and updating the displayed icon so that said displayed icon presents current status information concerning the associated aspect of said software application.

In one embodiment, the determining is performed synchronously by polling the software application to detect changes in status of the different aspects of the software application. In another embodiment, the determining is performed asynchronously in response to change notices generated by the software application when changes in the status of the different aspects thereof occur.

The graphical user interface may present a plurality of icons associated with at least one view of the software application. The software application may be a messaging application with each icon representing a different message folder of a view thereof and presenting the message-bearing state of the folder. Alternatively the software application may be an instant messaging application with each icon representing a different contact and presenting the status of the contact.

According to another aspect, there is provided a computing device comprising:

an operating system executable on hardware; and at least one resident software application running on a platform provided by said operating system, said at least one resident software application being represented by multiple icons displayed on a graphical user interface, wherein said displayed icons include status icons, each status icon relating to a different aspect of said software application and presenting current status information concerning that aspect of said software application, said operating system determining when a change in the status of an aspect of said software application represented by a displayed status icon occurs and updating said status icon accordingly.

BRIEF DESCRIPTION OF THE DRAWINGS

Embodiments will now be described, by way of example only, with reference to the accompanying drawings in which.

DESCRIPTION OF THE EMBODIMENTS

Figure 1:
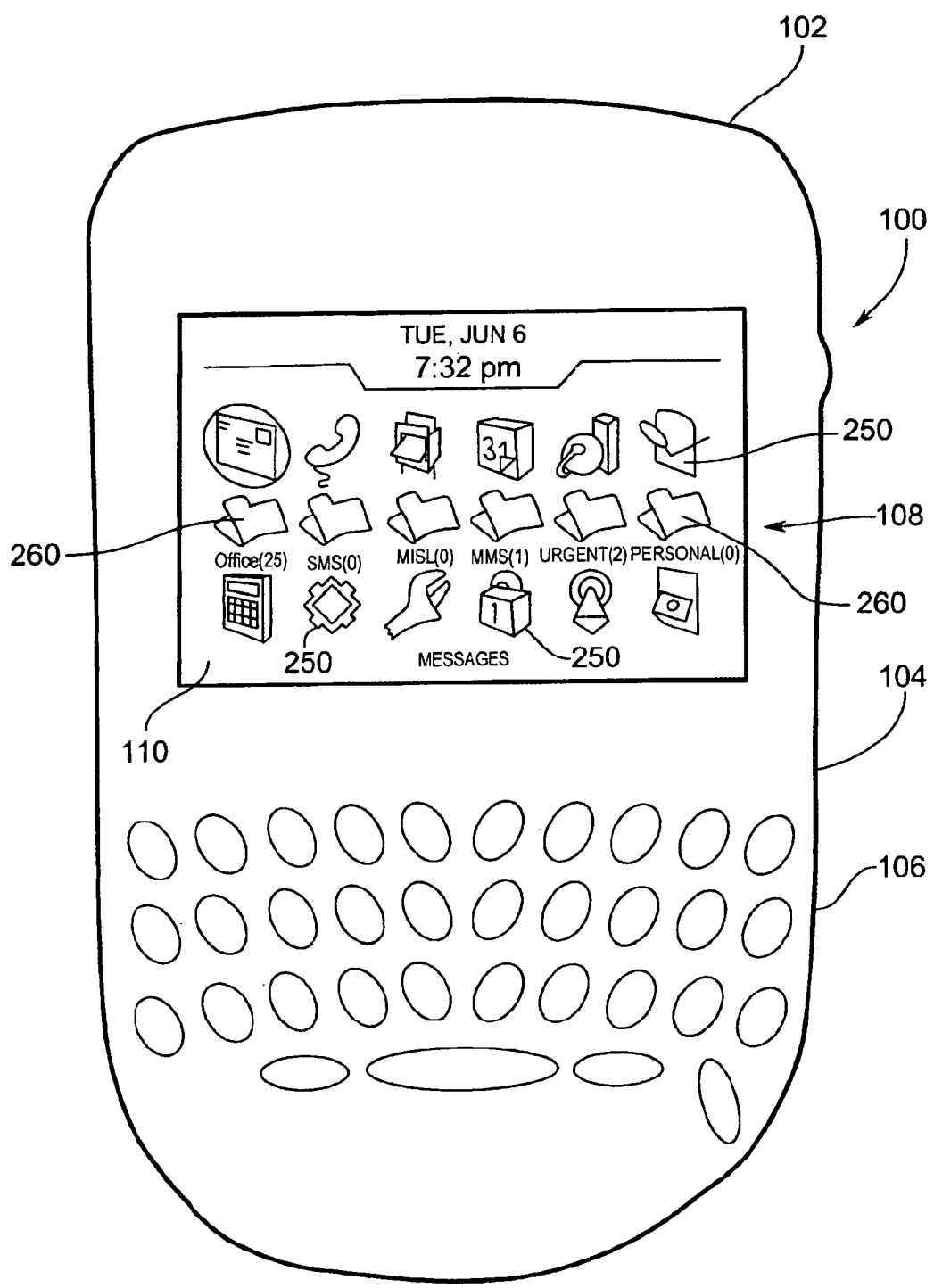
FIG. 1 is a front plan view of a portable wireless communications device including a display on which icons are presented.
Figure 2:
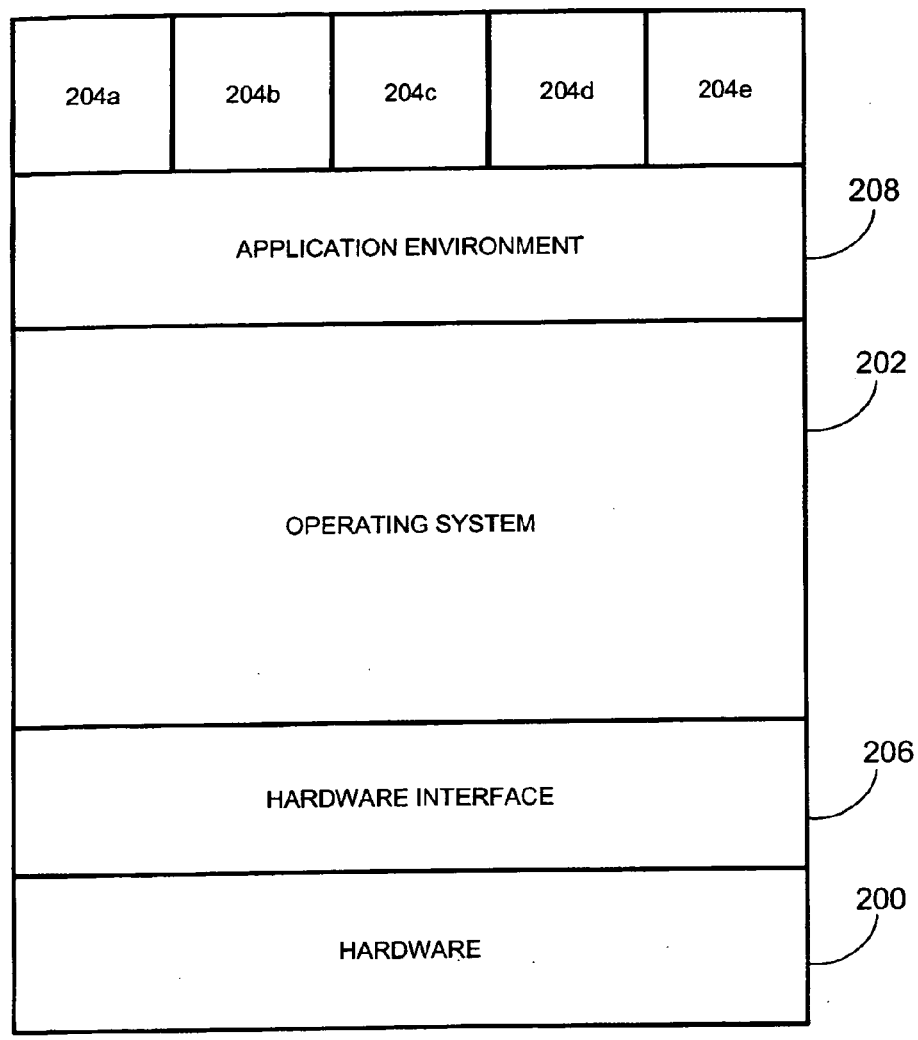
FIG. 2 is an abstract layer diagram showing hardware and software components of the communications device of FIG. 1.

Turning now to FIGS. 1 and 2, a portable wireless communications device is shown and is generally identified by reference numeral 100. As can be seen, communications device 100 includes a housing 102 having a front panel 104 on which a keypad 106 and display 108 are disposed. A graphical user interface (GUI) 110 is presented on the display 108.

Within the communications device housing 102 is the communications device hardware 200 on which an operating system (OS) 202 and a plurality of resident software applications 204a to 204e reside. The operating system 202 communicates with a hardware interface 206 and an application environment 208. In this manner, the OS 202 is able to control operation of the hardware 200 via the hardware interface 206 and provide a suitable operating platform for the software applications 204 via the application environment 208.

The GUI 110 presented on the display 108 corresponds to the application environment 208 and includes icons relating to various resident software applications. In some instances, the icons represent resident software applications that are running on the communications device 100 while in other instances the icons represent resident software applications that are dormant but which can be selected to launch and run the associated software applications. In the later case, when a software application is launched through selection of its corresponding icon, an application GUI of the launched software application may be presented on the display 108 overlying the GUI 110. The application GUI, depending on its configuration, may occupy all or part of the display 108.

Depending on the nature of the software application, the software application may be represented on the GUI 110 by a single icon or by a plurality of icons. Also, the icons may be of the conventional static type or may be status icons as will now be described.

For example, as shown in FIG. 1, the GUI 110 presents three rows of icons. Each icon 250 in the top row and the bottom row is of the conventional static type and relates to a different software application that may be dormant or running on the communications device 100. The icons 260 in the second row relate to different aspects of the same software application program, in this case a messaging application and are of the status type.

In particular, in this example, each of the status icons 260 represents a different message folder within a message view inbox. Those of skill in the art will appreciate however that message folders within other message views such as, for example, a sent box, outbox or draft box may also be displayed either in conjunction with or instead of the inbox message folders. Unlike conventional static icons, the status icons 260 not only represent the different message folders of the inbox but also provide status information concerning the content of the message folders. In this example, the status information displays the quantitative message-bearing state of each message folder. The quantitative message-bearing state may identify, for example, unread messages, flagged messages, read messages etc. The status information relating to the message folders is updated regularly to provide the user with up-to-date feedback concerning the quantity of various message types accessible via the message folders. The status information relating to the message folders may be updated synchronously or asynchronously. The type of software application and the nature of the status information being displayed determines how the status information is updated. For critical status information, asynchronous updating is typically used.

In the case of software applications that are represented by status icons 260, the set of status icons 260 may be fixed by the software application. Alternatively, the software application may provide the user with the facility to select from fixed sets of status icons 260 or select individual status icons. For example, the set of status icons may be fixed to be those that represent the folders of the message view inbox, outbox and draft box etc. Alternatively, the user may be able to select the message view or views whose folders are to be displayed. Still alternatively, the user may be able to select individual folders from the various message views.

Figure 3:
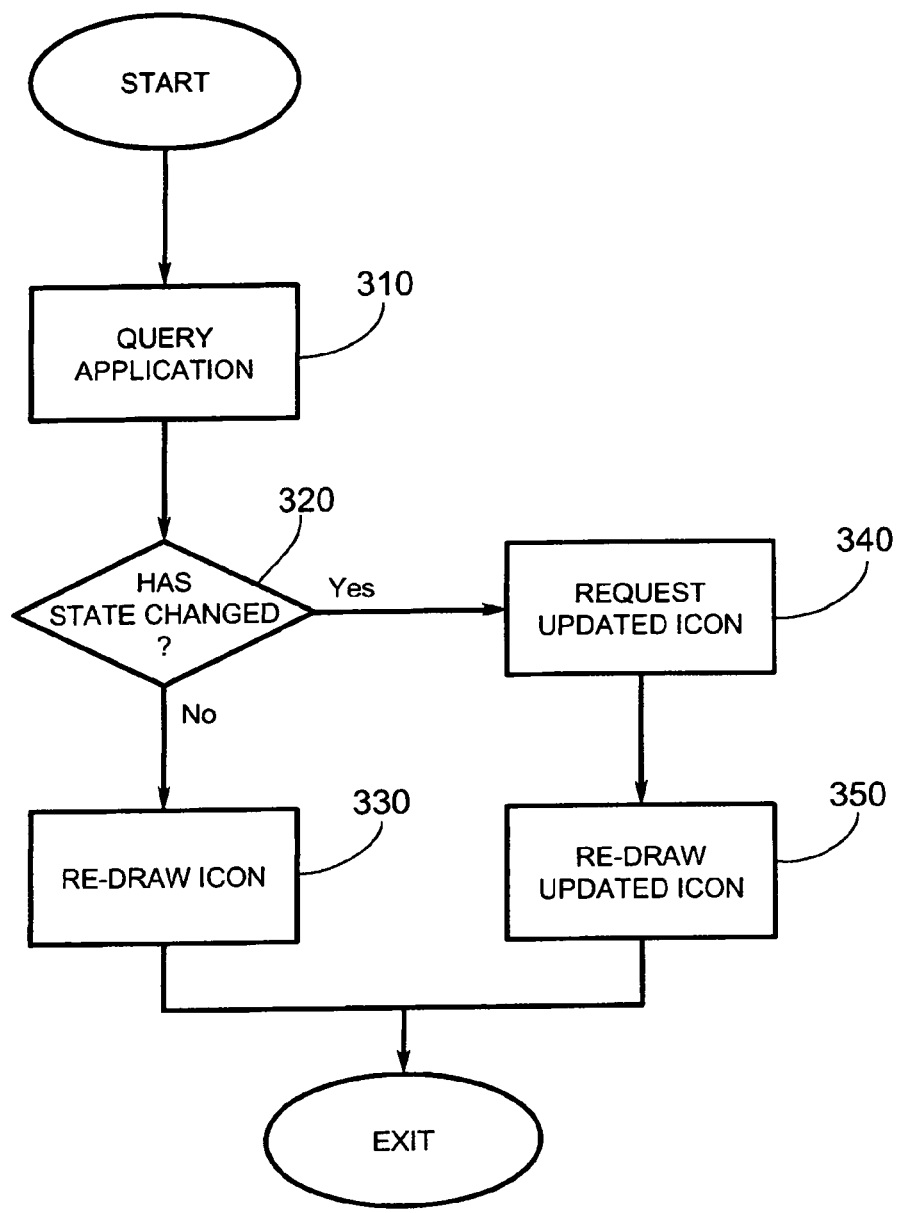
FIG. 3 is a flowchart showing the steps performed during synchronous updating of displayed status icons.

Turning now to FIG. 3, the steps performed during synchronous updating of the status icons are shown. As can be seen, when the GUI 110 is displaying status icons 260, the application environment 208 queries the software application(s) associated with the status icons (step 310) to determine if there is a change in the status of the software application(s) and hence the status information provided by the displayed status icons (step 320). For each status icon 260 where there has been no change in its status information, the status icon is simply either redrawn or left in its existing form (step 330). For each status icon 260 where there has been a change in the message-bearing state of its associated message folder, the application environment 208 requests updated icon information from the software application reflecting the current message-bearing state (step 340) and uses the updated icon information to draw the updated status icon (step 350). The synchronous updating of the status icons 260 is performed at an interval deemed appropriate for the nature of the status information being presented thereby to provide up-to-date status information.

Figure 4:
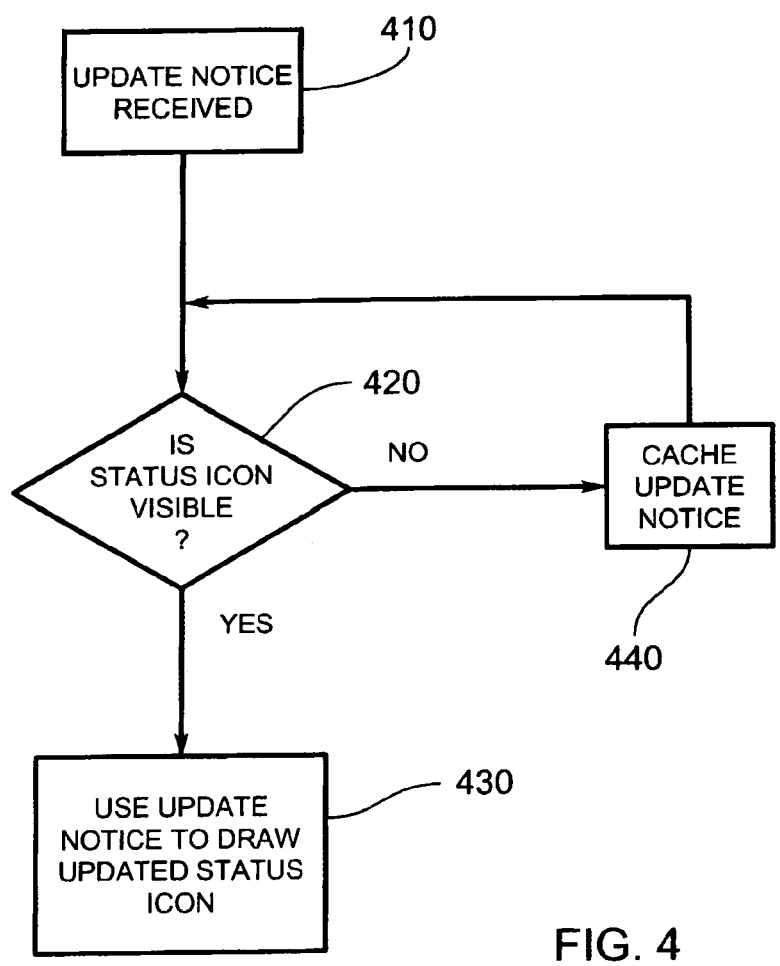
FIG. 4 is a flowchart showing the steps performed during asynchronous updating of displayed status icons.

Turning now to FIG. 4, the steps performed during asynchronous updating of the status icons 260 are shown. As can be seen, when the GUI 110 is displaying status icons, the application environment 208 monitors the software application(s) associated with the status icons 260 to await receipt of update notices generated by the software application(s) signifying a change in the message-bearing states of their associated message folders. The update notices include updated icon information to allow status icons 260 to be redrawn with current status information. Upon receipt of an update notice (step 410), the application environment 208 examines the status icon associated with the update notice to determine if the status icon is visible (step 420). If the status icon 260 is visible, the update notice is used to draw the updated status icon 260 thereby to provide up-to-date status information (step 430). At step 420, if the status icon is not visible, the update notice is cached (step 440). After an appropriate delay, the process reverts back to step 420 to determine if the status icon 260 is visible. Thus, in the event of a cached update notice, the status icon associated with the cached update notice is checked at intervals to determine if the status icon has become visible. When the status icon 260 becomes visible, the status icon is redrawn using the cached update notice (step 430). The above process is initiated whenever an update notice is received.

As will be appreciated, when the status icons are synchronously updated, displayed status icons 260 are updated at regular intervals chosen to ensure that the status information presented by the status icons remains current. When the status icons are asynchronously updated, the status icons 260 are updated whenever a status change of the related software application(s) occurs. By providing status icons, status information concerning the related software applications is visually presented to the user.

Although the status icons are shown and described as representing message folders associated with different views of a messaging application, those of skill in the art will appreciate that this is for illustrative purposes only. Status icons can be used to represent different aspects of virtually any software application. For example, the status icons may be used to represent different contacts in an instant messaging (IM) application and to present the status of these IM contacts, i.e. online, busy, away etc. Alternatively, the status icons may be used to represent different states of various game sessions of a gaming application.

The use of status icons is also not limited to portable wireless communication devices. The status icons can be used in basically any computing environment where icons are used to represent resident software applications and where additional status information concerning launched resident software applications is desired.

The above-described embodiments are intended to be examples only and alterations and modifications may be effected thereto, by those of skill in the art, without departing from the scope of the exclusive right which is defined solely by the claims appended hereto.

What is claimed is:

1. A method of updating a graphical user interface (GUI) comprising:

loading a GUI for an operating system into memory of a handheld computing device and displaying the GUI in a display of the handheld computing device, the operating system hosting the operation of a plurality of different computer programs;

rendering in the GUI a first set of icons, each icon of the first set configured upon activation to launch execution in the operating system of a corresponding one of the computer programs; and, rendering in the GUI a second set of icons, the icons of the second set including a first email icon and a second email icon, each of the icons in the second set further being associated with a numeric indication displayed in the GUI and corresponding to a number of respectively unread email messages.

2. The method of claim 1, wherein the numeric indication is a number of urgent, unread email messages.

3. The method of claim 1, wherein the numeric indication is a number of flagged, unread email messages.

4. The method of claim 1, further comprising rendering an additional icon in the GUI corresponding to a text messaging application and being associated with a numeric indication of a number of text messages in the text messaging application.

5. A method of updating a graphical user interface (GUI), the method comprising:

displaying in association with a first email icon rendered in a GUI for a home screen, a numeric indication of unread messages for first email accessible through the first email icon, and displaying in association with a second email icon rendered in the GUI for the home screen, a numeric indication of unread messages for the second email accessible through the second email icon; and, periodically updating the displayed a numeric indication of unread messages for each of the first email icon and the second email icon responsive to changes in a number of unread messages for the first email and the second email.

6. The method of claim 5, wherein the numeric indication is a number of urgent, unread email messages.

7. The method of claim 5, wherein the numeric indication is a number of flagged, unread email messages.

8. The method of claim 5, further comprising:

displaying in association with a text messages icon rendered in the GUI for the home screen, a numeric indication of unread text messages in a text messaging application accessible through the text messages icon; and periodically updating the displayed a numeric indication of unread text messages responsive to changes in the unread ones of the text messages.

9. A handheld wireless communications device, comprising:

a housing;

a processor, memory and a display disposed in the housing;

a user input device;

an operating system executing in the memory of the device and providing access to functionality of the device, the operating system hosting the operation of a plurality of different computer programs;

a graphical user interface (GUI) for the operating system displayed in the display, the GUI comprising a first set of icons, each icon of the first set configured upon activation to launch execution in the operating system of a corresponding one of the computer programs; and, a second set of icons displayed in the GUI of the operating system, the icons of the second set including a first email icon and a second email icon, each of the icons in the second set further being associated with a numeric indication displayed in the GUI and corresponding to a number of respectively unread email messages.

10. The device of claim 9, wherein the numeric indication is a number of urgent, unread email messages.

11. The device of claim 9, wherein the numeric indication is a number of flagged, unread email messages.

12. The device of claim 9, wherein one of the computer programs is a text messaging application, the device further comprising an additional icon displayed in the GUI of the operating system and corresponding to a numeric indication of a number of text messages of the text messaging application.

* * * * *